United States Patent
Lee et al.

(10) Patent No.: US 8,508,770 B2
(45) Date of Patent: Aug. 13, 2013

(54) IMAGE FORMING APPARATUS TO CONTROL A POWER SUPPLY, AND METHOD THEREOF

(75) Inventors: Jai-yeol Lee, Suwon-si (KR); In-gu Kwak, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 855 days.

(21) Appl. No.: 12/368,355

(22) Filed: Feb. 10, 2009

(65) Prior Publication Data

US 2010/0020350 A1    Jan. 28, 2010

(30) Foreign Application Priority Data

Jul. 28, 2008   (KR) ................................. 2008-73587

(51) Int. Cl.
*G06F 3/12*   (2006.01)
(52) U.S. Cl.
USPC ............ 358/1.15; 358/1.14; 399/37; 399/88; 399/13; 399/9; 399/49; 347/192; 348/372
(58) Field of Classification Search
USPC ...................... 358/1.14, 1.15; 399/37, 88, 13, 399/9, 49, 111; 347/192; 348/372
See application file for complete search history.

(56) References Cited

U.S. PATENT DOCUMENTS

| | | | |
|---|---|---|---|
| 4,412,735 A * | 11/1983 | Tsukata et al. ................. | 399/81 |
| 7,343,118 B2 | 3/2008 | Ahn et al. | |
| 7,574,150 B2 | 8/2009 | Eom | |
| 7,792,437 B2 | 9/2010 | You | |
| 2005/0105721 A1* | 5/2005 | Ono ................................ | 380/51 |
| 2006/0120756 A1* | 6/2006 | Ahn et al. .................... | 399/124 |
| 2007/0080786 A1 | 4/2007 | Kusumi | |
| 2007/0098437 A1 | 5/2007 | Kaiga | |
| 2007/0104495 A1* | 5/2007 | You ................................. | 399/9 |
| 2008/0019709 A1* | 1/2008 | Eom .............................. | 399/9 |

FOREIGN PATENT DOCUMENTS

| | | |
|---|---|---|
| CN | 1782923 | 6/2006 |
| CN | 1967397 | 5/2007 |
| CN | 101109914 | 1/2008 |
| EP | 1881375 | 1/2008 |
| JP | 2007098840 | 4/2007 |
| JP | 2007121746 | 5/2007 |
| KR | 1020050034194 | 4/2005 |
| KR | 1020060066886 | 6/2006 |
| KR | 1020080008622 | 1/2008 |

OTHER PUBLICATIONS

Korean Office Action Issued on Aug. 22, 2012 in KR Patent Application No. 10-2008-0073587.
Office Action issued in KR Application No. 200910128158.6 dated Mar. 26, 2013.

* cited by examiner

*Primary Examiner* — Jacky X Zheng
(74) *Attorney, Agent, or Firm* — Stanzione & Kim, LLP

(57) ABSTRACT

An image forming apparatus for controlling power supply is provided. An image forming apparatus includes at least one cover unit to be mounted in the image forming apparatus, at least one replaceable unit to participate in an image forming operation of the image forming apparatus, a sensing unit to sense whether the at least one cover unit is opened or closed, and a main board unit to cut off the power supply to the at least one replaceable unit for a predetermined period of time when the at least one cover unit is opened or closed. Accordingly, stable operation is enabled.

20 Claims, 10 Drawing Sheets

IMAGE FORMING APPARATUS TO CONTROL A POWER SUPPLY, AND METHOD THEREOF

CROSS-REFERENCE TO RELATED APPLICATIONS

This application claims priority under 35 U.S.C. §119 (a) from Korean Patent Application No. 10-2008-0073587, filed on Jul. 28, 2008, in the Korean Intellectual Property Office, the disclosure of which is incorporated herein by reference in its entirety.

BACKGROUND OF THE INVENTION

1. Field of the Invention

The present general inventive concept relates to an image forming apparatus using replaceable units and a power control method thereof. More particularly, the present general inventive concept relates to an image forming apparatus which controls power input to replaceable units according to whether a cover unit is opened or closed.

2. Description of the Related Art

As computers have become widespread, add-on peripherals for computers have also become widely used. Examples of add-on peripherals for computers include image forming apparatuses such as printers, scanners, copiers, multifunction peripherals, and so on.

Image forming apparatuses use ink or toner to print images onto paper. Ink or toner is used whenever printing is performed, and becomes exhausted after a certain period of time. In this case, units for storing ink or toner need to be replaced. Such components which can be replaced in image forming apparatuses are referred to as consumables or replaceable units.

Replaceable units mean units which need to be replaced due to exhaustion of ink or toner as described above, or units which need to be replaced due to changes in characteristics caused by use over a certain period of time, resulting in lower quality of printing. For example, in a laser image forming apparatus, diverse kinds of rollers and belts which are used in a charge unit, a transfer unit, a fusing unit, etc may become worn out or deteriorated by excessive use beyond their life span. As a result, the image quality may also deteriorate. Therefore, a user should replace the replaceable units on a proper replaceable time basis so that the laser image forming apparatus can print clearer images.

In order for the user to precisely check the replacement time for each replaceable unit and personally manage the replaceable units, a Customer Replaceable Unit Monitoring (CRUM) memory may be embedded in each replaceable unit. The state of use of each replaceable unit is recorded in the CRUM memory, so each replaceable unit can be managed in itself.

However, errors may occur while data are being recorded in or read out from the CRUM memory. One cause of such errors may be instability in the power supply when a cover unit is opened and closed.

Diverse cover units are mounted in a main body of an image forming apparatus. In general, if a cover unit is opened, the image forming apparatus aborts all operations for the safety of users. Subsequently, if the cover unit is closed, power is supplied again to each unit and thus operations are started again. The cover unit is determined to be opened or closed by sensing whether or not the cover unit is in contact with the main body of an image forming apparatus.

At the moment when the cover unit is closed, the cover unit may be in unstable contact with the main body, so power supply may also be unstable. Consequently, malfunctioning of the CRUM memory may occur.

SUMMARY

The present general inventive concept provides an image forming apparatus which prevents malfunctioning by effectively controlling power supply according to whether a cover unit is opened or closed, and a power control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including at least one cover unit to be mounted on the image forming apparatus, at least one replaceable unit to participate in an image forming operation of the image forming apparatus, a sensing unit to sense whether the at least one cover unit is opened or closed, and a main board unit to cut off the power supply to the at least one replaceable unit for a predetermined period of time when the at least one cover unit is opened and closed.

Each replaceable unit may include a replaceable unit monitoring unit (RUM) to manage the state of the replaceable unit.

The main board unit may be connected to the RUM in the at least one replaceable unit via a signal line and a power line, and may cut off the power supply via the power line from a point of time when the at least one cover unit is opened until the at least one cover unit is closed and the predetermined period of time elapses.

The image forming apparatus may further include a shock-absorbing unit to lessen an impact occurring when the at least one cover unit is closed, wherein the main board unit cuts off power supply until the at least one cover unit is shock-absorbed by the shock-absorbing unit and completely closed to a main body of the image forming apparatus.

The RUM may include a central processing unit (CPU), wherein the CPU may execute a series of instructions.

The series of instructions may be an operating system (an OS).

The foregoing and/or other aspects and utilities of the present general inventive concept may be achieved by providing a method of controlling the power supply of an image forming apparatus which includes at least one cover unit capable of being opened or closed and at least one replaceable unit, wherein the image forming apparatus performs an image forming operation using the at least one replaceable unit, the method including sensing whether the at least one cover unit is opened or closed, and cutting off the power supply to the at least one replaceable unit for a predetermined period of time when it is sensed that the at least one cover unit is opened and closed.

In the operation of cutting off the power supply, the power supply to a RUM to be installed in each replaceable unit may be cut off.

In the operation of cutting off power supply, the power supply may be cut off from a point of time when the at least one cover unit is opened until the at least one cover unit is closed and the predetermined period of time elapses.

In the operation of cutting off the power supply, the power supply may be cut off until the at least one cover unit is shock-absorbed by a shock-absorbing unit and completely closed to a main body of the image forming apparatus.

The RUM may include a CPU, wherein the CPU may execute a series of instructions.

The series of instructions may be an OS.

The main board unit may be connected to the RUM in the at least one replaceable unit via a signal lime and a power line.

The main board unit may cut off the power supply via the power line.

The foregoing and/or other aspects and utilities of the present general inventive concept may be achieved by providing a method of controlling the power supply of an image forming apparatus, the method including sensing an at least one cover unit as being opened, cutting off a power supply to an at least one replaceable unit, sensing the at least one cover unit as being closed, waiting for a predetermined period of time to elapse, and returning the power supply to the at least one replaceable unit.

In the operation of sensing the at least one cover unit as being closed, the operation may further include sensing that the at least one cover unit has been shock-absorbed by a shock-absorbing unit to lessen an impact.

The operation of cutting off the power supply to the at least one replaceable unit may include cutting off the power supply to an RUM to be installed in each of the at least one replaceable unit.

The RUM may include a CPU, wherein the CPU may execute a method.

The executable method may be an OS.

The method may include a main board unit that may be connected to the RUM in the at last one replaceable unit via a signal line and a power line.

The main board unit may cut off the power supply via the power line.

BRIEF DESCRIPTION OF THE DRAWINGS

These and/or other aspects and utilities of the present general inventive will become apparent and more readily appreciated from the following description of the embodiments, taken in conjunction with the accompanying drawings of which.

DETAILED DESCRIPTION

Figure 1:
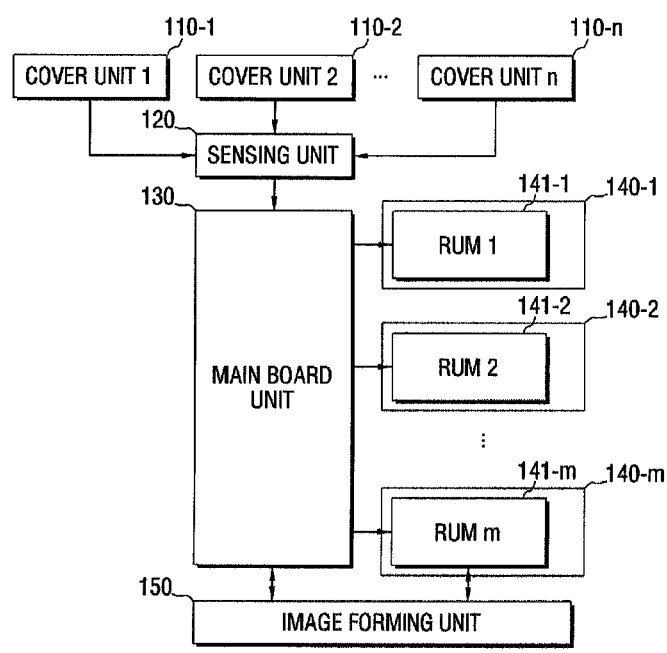
FIG. 1 is a schematic block diagram illustrating a configuration of an image forming apparatus according to an exemplary embodiment of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a schematic block diagram illustrating a configuration of an image forming apparatus according to an exemplary embodiment of the present general inventive concept. As illustrated in FIG. 1, the image forming apparatus may include a plurality of cover units 110-1 to 110-$n$, a sensing unit 120, a main board unit 130, and a plurality of replaceable units 140-1 to 140-$m$.

The image forming apparatus may further include an image forming unit 150 using at least one of the plurality of replaceable units 140-1 to 140-$m$. The image forming unit 150 feeds a printing medium, forms an image on the printing medium, and discharges the printing medium. An operation of the image forming unit 150 may be controlled by data stored in the at least one of a plurality of replaceable units 140-1 to 140-$m$. For example, the main board unit 130 may control the image forming unit 150 according to the status of the plurality of cover units 110-1 to 110-$n$ and/or replaceable units 140-1 to 140-$m$.

As used herein, "replaceable units" mean units which can be replaced. For example, "replaceable units" may include, but are not limited to, ink, toner, rollers, belts, etc. "Replaceable units" may need to be replaced, for example, due to exhaustion of supply, due to changes in characteristics caused by use over a certain period of time, or for other reasons that would result in a lower quality of printing.

The plurality of replaceable units 140-1 to 140-$m$ are mounted in the image forming apparatus, and are used for a plurality of jobs such as printing jobs or scanning jobs. More specifically, the plurality of replaceable units 140-1 to 140-$m$ may be toner or ink cartridges, an electric charge unit, a transfer unit, a fusing unit, an organic photo conductor (OPC), and a feeding roller.

The replaceable units 140-1 to 140-$m$ may include replaceable unit monitoring units (RUMs) 141-1 to 141-$m$, respectively. The RUMs 141-1 to 141-$m$ monitor or manage respective replaceable units 140-1 to 140-$m$. For example, RUM 141-1 monitors or manages replaceable unit 140-1, RUM 141-2 monitors or manages replaceable unit 140-2, etc. More specifically, RUMs record and manage diverse information such as the specifications of the respective replaceable units 140-1 to 140-$m$ and information on changes in their state of use. This will be described in greater detail below.

The plurality of cover units 110-1 to 110-$n$ may be formed on the exterior of a main body of the image forming apparatus, or inside the main body of the image forming apparatus, and may be opened and closed. When repairing or replacing components of the image forming apparatus or supplementing paper or toner, a user has to look into the inside of the image forming apparatus, so diverse cover units are provided.

The sensing unit 120 senses whether each cover unit 110-1 to 110-$n$ is opened or closed. More specifically, when each cover unit 110-1 to 110-$n$ is closed, each cover unit 110-1 to 110-$n$ is in contact with the image forming apparatus at some portion. If the portion is implemented as a switch, the switch can sense whether each cover unit 110-1 to 110-n is opened or closed. For example, if each cover unit 110-1 to 110-n is closed, the sensing unit 120 may output a high pulse, and if each cover unit 110-1 to 110-n is opened, the sensing unit 120 may output a low pulse.

The main board unit 130 controls the overall operation of the components in the image forming apparatus. In particular, the main board unit 130 cuts off the power supply to the replaceable units 140-1 to 140-m for a predetermined period of time according to the sensing results of the sensing unit 120. That is, the main board unit 130 is connected to each RUM 141-1 to 141-m in respective replaceable units 140-1 to 140-m via a signal line and a power line, so that the main board unit 130 can provide driving power to each RUM 141-1 to 141-m via the power line, and transmit information to or receive information from each RUM 141-1 to 141-m.

If the sensing unit 120 senses that one of the plurality of cover units 110-1 to 110-n is opened, the main board unit 130 cuts off the power supply to the RUMs 141-1 to 141-m. In this case, the main board unit 130 may cut off power from a power supply (not shown) to the replaceable units 140-1 to 140-m as well as power via the power line.

Subsequently, if the sensing unit 120 senses that the opened cover unit (for example, the first cover unit 110-1) is closed, the main board unit 130 stands by for a predetermined period of time and restarts the power supply to the RUMs 141-1 to 141-m. The stand-by time may be set to diverse values by experiments. For example, the stand-by time can be set by repeatedly measuring the time which it takes for the first cover unit 110-1 to be fixed in place stably in contact with the main body of the image forming apparatus when the first cover unit 110-1 is closed. As an example, the stand-by time may be about 1 ms.

The cover units 110-1 to 110-n may be manufactured in diverse forms at diverse positions on the image forming apparatus. The time which it takes for each cover unit 110-1 to 110-n to be completely closed may vary. Accordingly, the same stand-by time does not need to be applied to all cover units 110-1 to 110-n, so a proper stand-by time can be set for each cover unit 110-1 to 110-n separately.

As described above, the main board unit 130 provides power after the predetermined period of time. This prevents an unstable power supply that would result if power was provided as soon as a cover unit is closed. As a result, errors and malfunctioning due to the intervention of noise during communication with the RUMs 141-1 to 141-m, caused by an unstable power supply, can be prevented.

Figure 2:
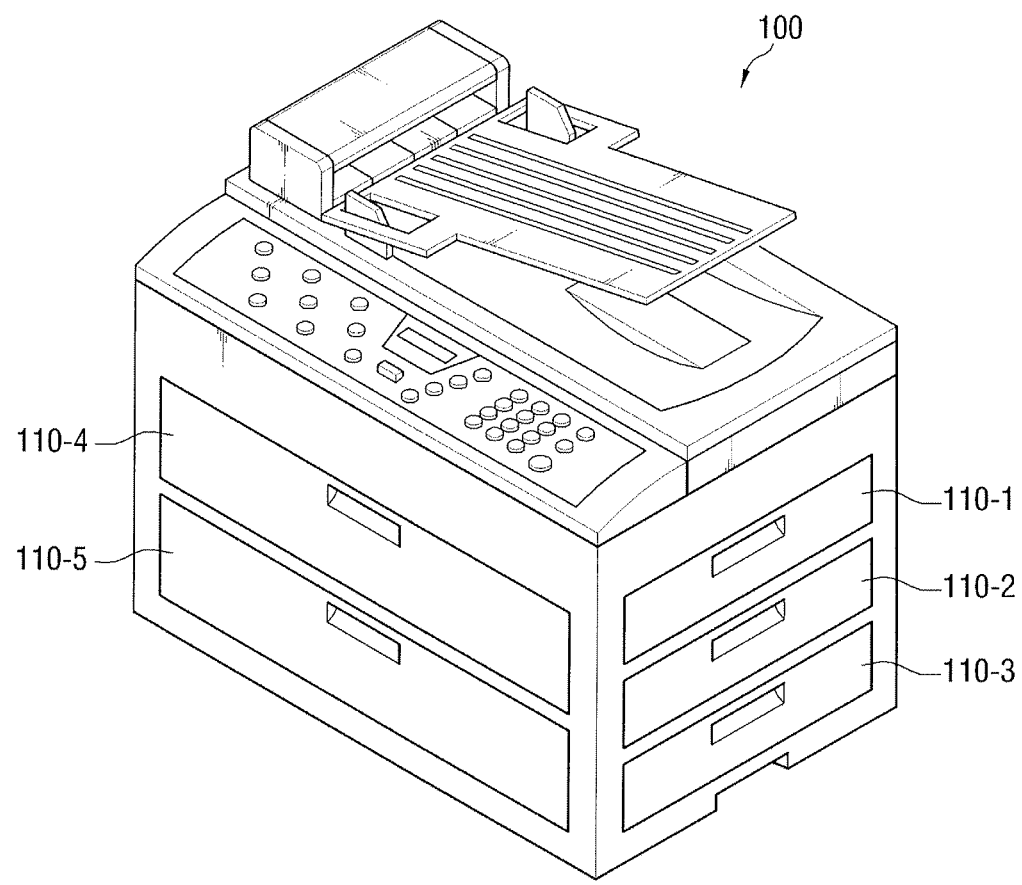
FIG. 2 is a diagram illustrating the exterior configuration of the image forming apparatus according to an exemplary embodiment of the present general inventive concept.

FIG. 2 is a diagram illustrating the exterior configuration of the image forming apparatus 100 according to the exemplary embodiment of the present general inventive concept. Referring to FIG. 2, the image forming apparatus 100 includes a plurality of cover units 110-1 to 110-5. In FIG. 2, the cover units 110-1 to 110-5 include cover units 110-1 to 110-3 for removing jam, and paper trays 110-4 to 110-5. However, the cover units 110-1 to 110-5 may include any kinds of cover units, such as cover units provided to replace internal components, such as a developing unit.

In FIGS. 1 and 2, there are a plurality of cover units and a plurality of replaceable units, but they do not have to be provided in plural. The present general inventive concept may also be applied when there is a single cover unit and a single replaceable unit.

Figure 3:
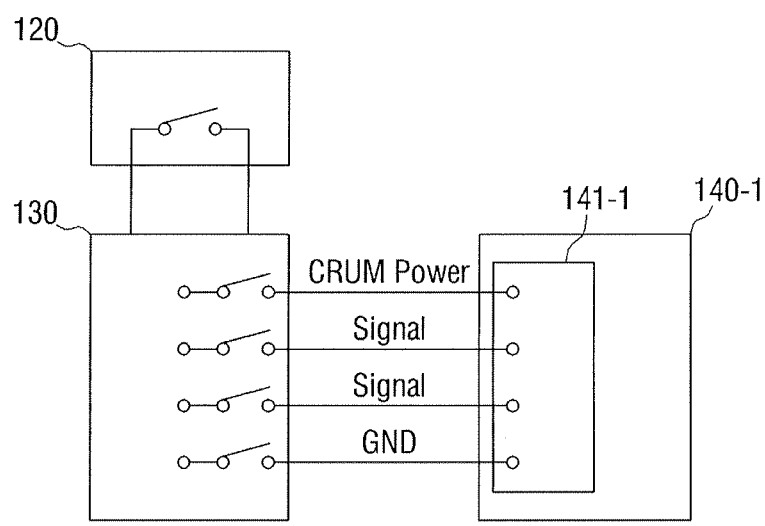
FIG. 3 is a diagram illustrating the interior configuration of the image forming apparatus according to an exemplary embodiment of the present general inventive concept.

FIG. 3 is a diagram illustrating the interior configuration of the image forming apparatus 100 according to the exemplary embodiment of the present general inventive concept. Referring to FIG. 3, the sensing unit 120 includes a switch to perform switching according to whether the cover units 110-1 to 110-n are opened or closed, and provides the main board unit 130 with a sensing signal according to the result of switching.

The main board unit 130 is connected to the respective RUMs 141-1 to 141-m in the respective replaceable units 140-1 to 140-m via the signal line and the power line (power or GND), so the power line can be turned on or off according to a sensing signal from the sensing unit 120. For convenience of description, FIG. 3 illustrates only a first replaceable unit 140-1, but the main board unit 130 may be connected to other replaceable units 140-2 to 140-m in the same manner.

Figure 4:
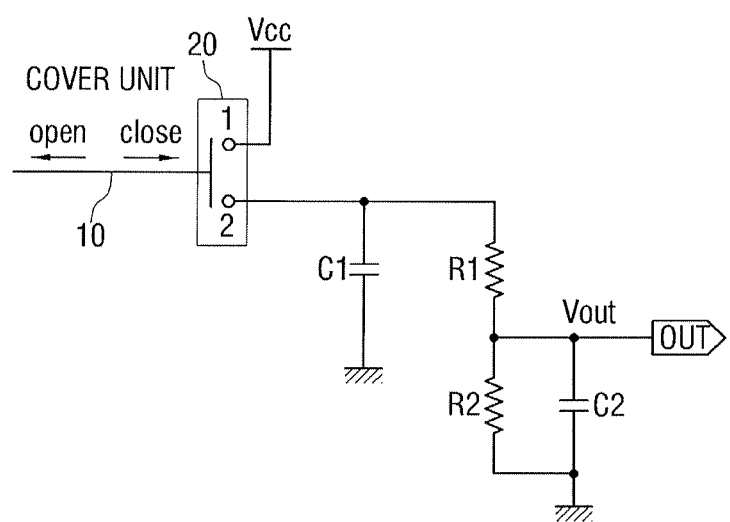
FIG. 4 is a diagram illustrating the circuit configuration of a sensing unit.

FIG. 4 is a circuit diagram illustrating an example of the configuration of the sensing unit 120 in the image forming apparatus 100 according to the exemplary embodiment of the present general inventive concept. Referring to FIG. 4, the sensing unit 120 includes a switch 10 to be interlocked according to whether the respective cover units 110-1 to 110-n are opened or closed, and contact points 1 and 2. Accordingly, if the switch 10 is connected to the contact points 1 and 2, node 1 and node 2 are connected so that Vcc is provided to a first end of a resistor R1. As a result, voltage is divided, so Vout of a predetermined voltage is output. In FIG. 4, there are two capacitors (C1 and C2) and two resistors (R1 and R2) in the circuit, but the circuit can be diversely constructed for the same purpose.

Figure 5:
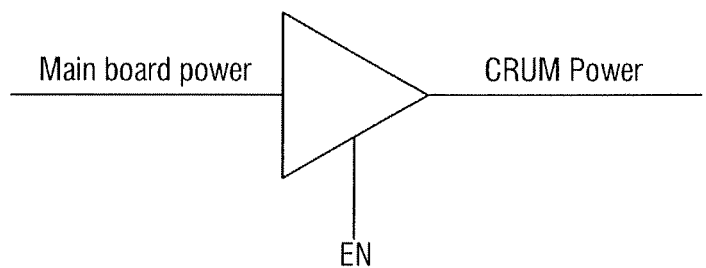
FIG. 5 is a diagram illustrating a control method of a main board unit.

FIG. 5 is a diagram illustrating the circuit configuration of the main board unit 130. Referring to FIG. 5, the main board unit 130 includes an operational amplifier to convert main board power into CRUM power. The conversion of the operational amplifier is controlled by a control signal EN. That is, when the sensing unit 120 senses that at least one of the cover units 110-1 to 110-n is opened or closed, if the predetermined period of time has not elapsed, the main board unit 130 inputs the EN signal to be a low value, so CRUM power is not output. If the predetermined period of time has elapsed, and the sensing unit 120 senses that all of the cover units 110-1 to 110-m are closed, the main board unit 130 inputs the EN signal to be a high value, so CRUM power is output.

Figure 6:
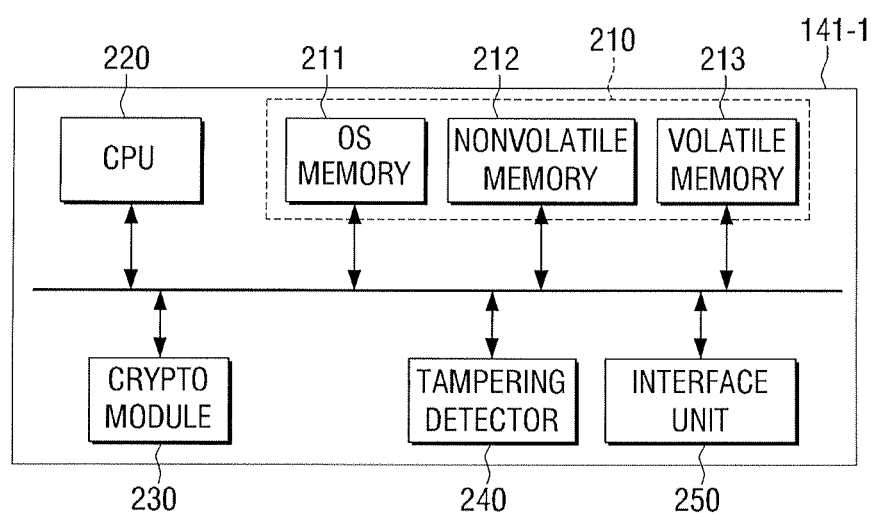
FIG. 6 is a schematic block diagram illustrating an example of a configuration of a RUM.

FIG. 6 is a schematic block diagram illustrating an example of a configuration of a RUM in the image forming apparatus 100 according to the exemplary embodiment of the present general inventive concept. In FIG. 6, a first RUM 141-1 is illustrated as an example, but the same configuration may be applied to other RUMs 141-2 to 141-m and also different configuration may be applied.

The RUMs 141-1 to 141-m may be CRUM units or Supplier Replaceable Unit Monitor (SRUM) units.

Referring to FIG. 6, the first RUM 141-1 may include a memory unit 210, a central processing unit (CPU) 220, a crypto module 230, a tempering detector 240, and an interface unit 250.

The memory unit 210 stores diverse types of information on the replaceable unit 140-1. More specifically, the replaceable unit 140-1 may contain information such as the manufacturer, the manufactured date, the serial number and the model name, diverse programs, electronic signature information, and information on using state (for example, how many copies have been printed until now?, How many more copies can be printed?, or How much toner is remaining?, and the like).

For example, the memory unit 210 may store the following information.

TABLE 1

| General Information | |
|---|---|
| OS Version | CLP300__V1.30.12.35 02-22-2007 |
| SPL-C Version | 5.24 06-28-2006 |
| Engine Version | 6.01.00(55) |
| USB Serial Number | BH45BAIP914466B. |
| Set Model | DOM |
| Service Start Date | 2007-09-29 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Tray1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK: 0,0,0,0) |
| Setup Menu | |
| Power Save | 20 Minutes |
| Auto Continue | On |
| Altitude Adj. | Plain |

As illustrated above, the memory unit 210 may store information on the life of consumables, information on consumables, set-up menus, schematic information, and the like on the replaceable unit 140-1.

The CPU 220 controls the overall operation of the RUM 140-1, and communicates with the main body of the image forming apparatus 100. To this end, the CPU 220 may use its own operating system (OS).

The OS is provided to drive a unit, representing a series of instructions to operate general application programs. Using its own OS, the CPU 220 can itself perform initialization, and perform authentication or encryption data communication with the main body of the image forming apparatus 100.

More specifically, the CPU 220 can perform initialization on particular events, such as, when the image forming apparatus 100 is powered on or when the replaceable unit 140-1 is detached from and attached to the image forming apparatus.

The initialization may include diverse procedures such as initial driving of diverse application programs used in the replaceable unit 140-1, calculation of secret information needed for data communication with the image forming apparatus 100 after initialization, communication channel set-up, memory value initialization, confirmation of replacement time, internal register value setting, and internal and external clock signal settings.

Prior to the present general inventive concept, an image forming apparatus would supply power as soon as a cover unit is closed. Additionally, if the CPU 220 is mounted in the RUM 141-1, the CPU 220 may try to communicate with an incorrect address, so communication may be impossible. This is because the power supply is unstable because of bouncing occurring due to the elasticity of a portion of a cover unit which is in contact with the image forming apparatus. However, in the image forming apparatus 100 according to the exemplary embodiment of the present general inventive concept, since power is stably supplied by being cut off for the predetermined period of time, such a situation can be prevented.

The crypto module 230 supports encryption algorithm so as to enable authentication or encrypted communication between the CPU 220 and the main body of the image forming apparatus 100. In greater detail, the crypto module 230 may support diverse encryption algorithms such as ARIA, Triple Data Encryption Standard (TDES), SEED, Advanced Encryption Standard (AES) symmetric key algorithms, and the like.

The tempering detector 240 protects against diverse physical hacking trials, that is, tempering. More specifically, while monitoring operating environments such as the voltage, temperature, pressure, light, and frequency, if physical hacking trials occur, the tempering detector 240 may delete data or physically block the hack. In this case, the tempering detector 240 may have a separate power supply.

If the RUM 141-1 has the crypto module 230 and the tempering detector 240, systematic data security using both hardware and software is enabled.

Referring to FIG. 6, the memory unit 210 may include at least one of an OS memory 211, a nonvolatile memory 212, and a volatile memory 213. The OS memory 211 may store an OS to operate the replaceable unit 140-1. The nonvolatile memory 212 may store diverse data nonvolatilely. The volatile memory 213 may be used as a temporary storage unit for operations.

In FIG. 6, the memory unit 210 includes the OS memory 211, the nonvolatile memory 212, and the volatile memory 213, but some of these may be implemented as internal memories embedded in the CPU 220. Unlike general memories, such memories 211, 212, and 213 can be implemented according to the security design such as address/data line scrambling or bit encryption.

The nonvolatile memory 212 may store diverse information such as electronic signature information, diverse encryption algorithm information, information on the state of the replaceable unit 140-1 (for example, the quantity of toner remaining, the time for replacement, and the quantity of printable copies, etc.), unique information (for example, the manufacturer, manufactured date, serial number, and model name, etc.), and information on after-sales service. That is, the nonvolatile memory 212 may store information as illustrated in Table 1.

The interface unit 250 connects the CPU 220 to the main board unit 130. More specifically, the interface unit 250 may be implemented as a serial interface or a wireless interface. The serial interface uses a smaller number of signals compared with a parallel interface, so costs can be reduced, but the serial interface is more suitable for an operating environment having large amount of noise.

Figure 7:
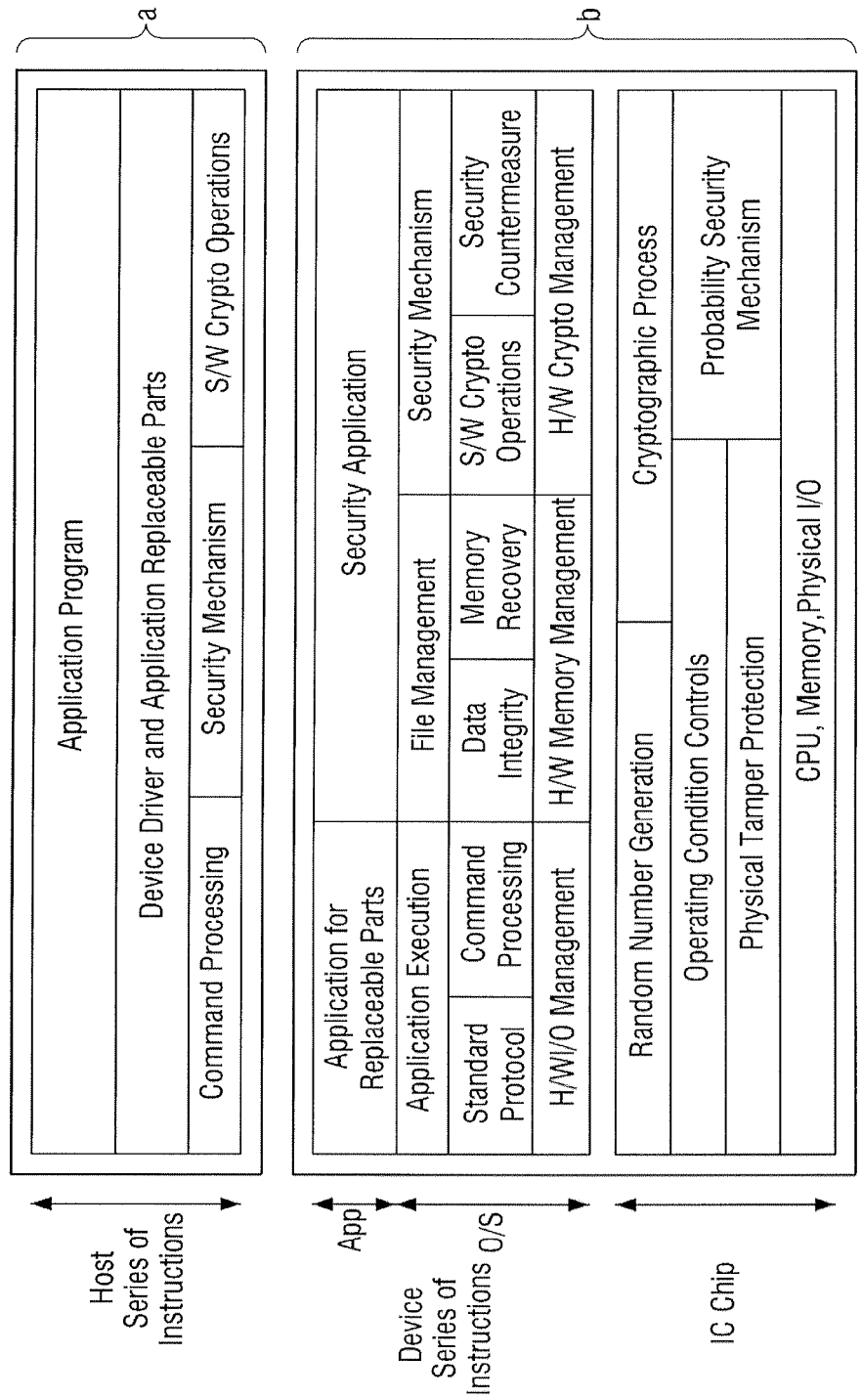
FIG. 7 is a diagram illustrating an example of a configuration of a series of instructions relating to the image forming apparatus according to an exemplary embodiment of the present general inventive concept.

FIG. 7 is a systematic diagram illustrating a configuration of a series of instructions relating to the replaceable unit 140-1 and the image forming apparatus 100 according to the exemplary embodiment of the present general inventive concept.

Referring to FIG. 7, series of instructions (a) of the image forming apparatus 100 may include, but is not limited to, general application programs, applications for managing data of each unit and a device driver for direct management, command processing programs, security mechanisms for authentication and encryption with the replaceable unit 140-1, and software cryptographic operations area for performing software encryption operation.

Series of instructions (b) of the replaceable unit 140-1 may include, but is not limited to, an integrated circuit (IC) chip area consisting of diverse blocks for data protection, an application area for interfacing with host software, and an OS area for operating them.

Basic components of the OS such as file management and operation blocks needed for data protection are displayed on the device series of instructions area of FIG. 7. In brief, the series of instructions relating to the device consist of programs for controlling hardware constituting a security system, application programs, and programs for preventing tempering. Since an application program for implementing a CRUM function is loaded on those programs, it is impossible to identify practical data content in a communication channel. A program implemented to include basic components should be closely programmed for effective data protection so as not to leave blind points in security in OS standard.

Meanwhile, the image forming apparatus 100 may further include a shock-absorbing unit to lessen impacts occurring when the cover unit is closed.

Figure 8:
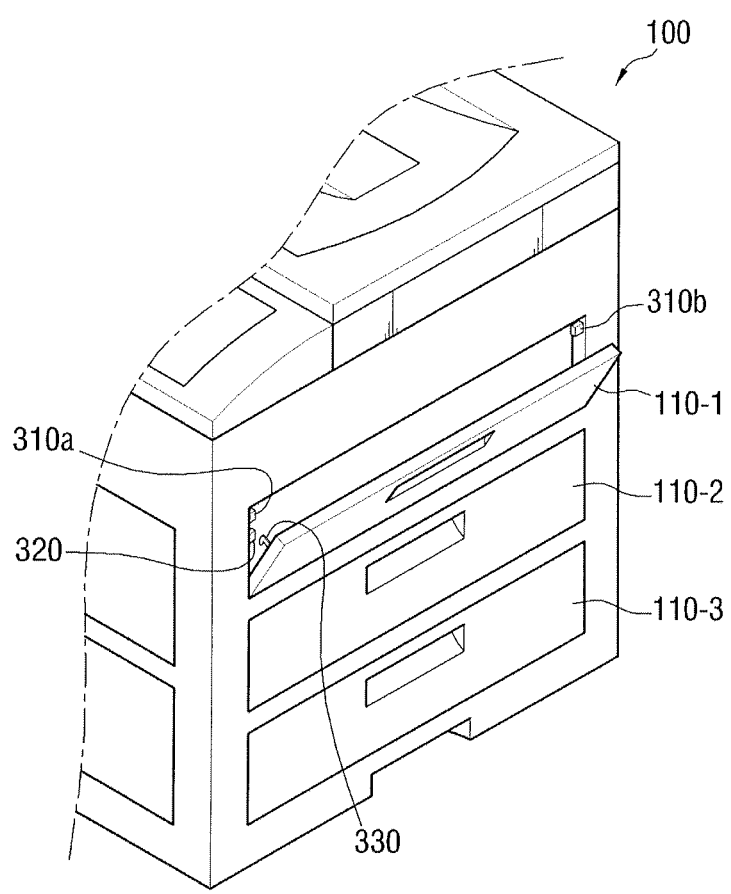
FIG. 8 is a diagram illustrating an example of a configuration of a cover unit of the image forming apparatus according to an exemplary embodiment of the present general inventive concept.

FIG. 8 is a diagram illustrating a configuration of the image forming apparatus 100 including the shock-absorbing unit. Referring to FIG. 8, the main body of the image forming apparatus 100 includes a fixing unit 320 to fix the cover unit, and the first cover unit 110-1 includes a hooking unit 330. In addition, the shock-absorbing unit 310*a* and 310*b* such as a spring is mounted between the main body of the image forming apparatus 100 and the first cover unit 110-1.

In this case, the stand-by time when the main board unit 130 cuts off power supply may be set to be a time which it takes for the shock-absorbing unit 310*a* and 310*b* to absorb the impacts and for the first cover unit 110-1 to be stably closed.

Figure 9:
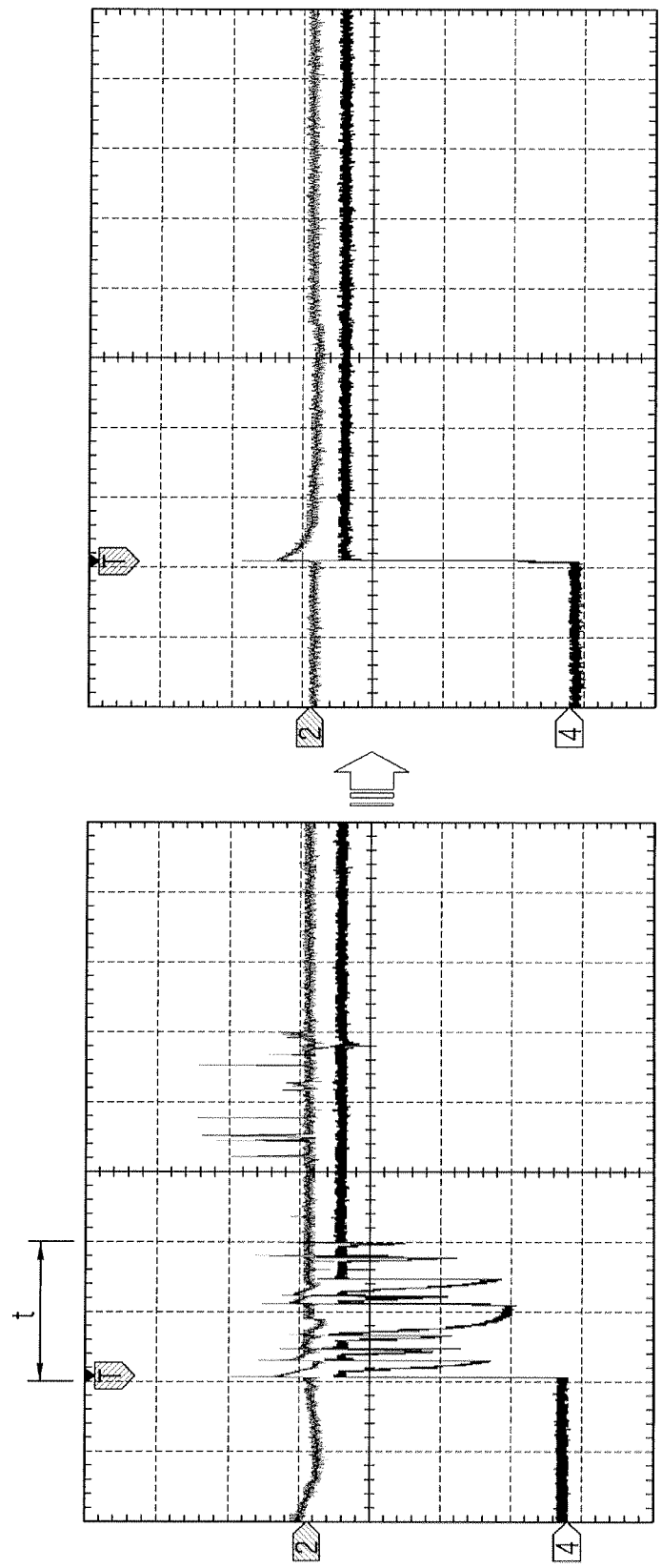
FIG. 9 is a diagram illustrating a method for removing noise in the image forming apparatus according to the exemplary embodiment of the present general inventive concept.

FIG. 9 is a diagram illustrating an effect of removing noise by cutting off power supply for a predetermined period of time. In FIG. 9, whether noise is generated is tested using two frequency channels 2 and 4.

In the left drawing of FIG. 9, a considerable amount of noise is generated for a predetermined period of time (t) from a point of time (T) when a cover unit is closed. Such noise may cause malfunctioning in communication between the RUMs 141-1 to 141-*m* and the main body of the image forming apparatus 100.

However, as in the image forming apparatus 100 according to the exemplary embodiment of the present general inventive concept, if the power supply is cut off for a predetermined period of time, a section in which noise is generated is removed as illustrated in the right drawing of FIG. 9. Consequently, stable system operation is enabled.

Figure 10:
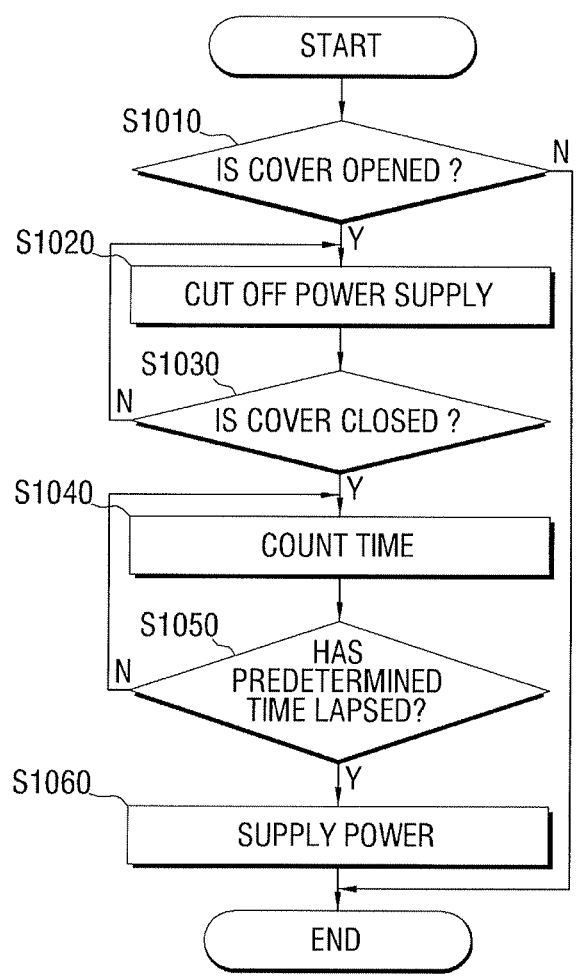
FIG. 10 is a flowchart illustrating a method for controlling power supply in the image forming apparatus according to an exemplary embodiment of the present general inventive concept.

FIG. 10 is a flowchart illustrating a method for controlling power supply in the image forming apparatus according to the exemplary embodiment of the present general inventive concept.

Referring to FIG. 10, in operation S1010 if at least one of the cover units in the image forming apparatus is opened, in operation S1020 the power supply to each component of the image forming apparatus is cut off.

In operation S1030 if the opened cover unit is closed, in operation S1040, a time is counted from the point of time when the opened cover unit is closed. In operation S1050 if the counted time exceeds a predetermined period of time, in operation S1060 power supply is restarted.

The power may be power which is supplied to the replaceable units 140-1 to 140-*m*, or power which is supplied to the RUMs 141-1 to 141-*m*.

The stand-by time from the point of time when the opened cover unit is closed to the point of time when the power supply is restarted may be set to diverse values according to the type of cover unit.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   at least one cover unit mounted in the image forming apparatus;
   at least one replaceable unit, comprising a customer replaceable unit monitoring unit (CRUM) to manage a state of the replaceable unit, to participate in an image forming operation of the image forming apparatus;
   a sensing unit to sense whether the at least one cover unit is opened or closed; and
   a main board unit to cut off a power supply when the at least one cover unit is opened, and maintaining cut off to the at least one replaceable unit for a predetermined period of time that begins after closing the cover,
   wherein the CRUM comprises:
      a memory unit to store an initialization program different from an operating system (OS) operated by the image forming apparatus unique information associated with the replaceable unit and status information on use of consumables used in the image forming apparatus; and
      a central processing unit (CPU) which communicates with the memory unit, wherein the CPU is operable to perform initialization of the replaceable unit using the initialization program which operates separately from the OS operated by the image forming apparatus when the replaceable unit is detached from and attached to the image forming apparatus, to perform authentication and cryptographic data communication with the main board unit.

2. The image forming apparatus of claim 1, wherein the main board unit is connected to the CRUM in the at least one replaceable unit via a signal line and a power line, and the main board unit cuts off the power supply via the power line from a point of time when the at least one cover unit is opened until the at least one cover unit is closed, and the predetermined period of time elapses.

3. The image forming apparatus of claim 1, further comprising:
a shock-absorbing unit to lessen an impact occurring when the at least one cover unit is opened or closed,
wherein the main board unit cuts off the power supply until the at least one cover unit is shock-absorbed by the shock-absorbing unit and completely closed to a main body of the image forming apparatus.

4. The image forming apparatus of claim 1, wherein the CPU executes a series of instructions.

5. The image forming apparatus of claim 4,
wherein the series of instructions comprises an operating system (an OS).

6. The image forming apparatus of claim 1, wherein the main board unit is connected to the CRUM in the at least one replaceable unit via a signal line and a power line.

7. The image forming apparatus of claim 6, wherein the main board unit cuts off the power supply via the power line.

8. A method of controlling the power supply of an image forming apparatus which comprises at least one cover unit capable of being opened or closed and at least one replaceable unit, including a customer replaceable unit monitoring unit (CRUM) to manage a state of the replaceable unit, to be replaceable, wherein the image forming apparatus performs an image forming operation using the at least one replaceable unit, the method comprising:
sensing whether the at least one cover unit is opened or closed; and
cutting off a power supply to the at least one replaceable unit when the at least one cover unit is opened, and maintaining cut off for a predetermined period of time that begins after closing the cover,
wherein the CRUM comprises:
a memory unit to store an initialization program different from an operating system (OS) operated by the image forming apparatus unique information associated with the replaceable unit and status information on use of consumables used in the image forming apparatus; and
a central processing unit (CPU) which communicates with the memory unit, wherein the CPU is operable to perform initialization of the replaceable unit using the initialization program which operates separately from the OS operated by the image forming apparatus when the replaceable unit is detached from and attached to the image forming apparatus, to perform authentication and cryptographic data communication with a main body of the image forming apparatus.

9. The method of claim 8, wherein in the operation of cutting off the power supply, the power supply is cut off to the CRUM, prior to installing the CRUM in each replaceable unit.

10. The method of claim 9, wherein in the operation of cutting off the power supply, the power supply is cut off from a point of time when the at least one cover unit is opened until the at least one cover unit is closed and the predetermined period of time elapses.

11. The method of claim 10, wherein in the operation of cutting off the power supply, the power supply is cut off until the at least one cover unit is shock-absorbed by a shock-absorbing unit installed in the main body of the image forming apparatus and the at least one cover unit is completely closed to the main body of the image forming apparatus.

12. The method of claim 9, wherein the CPU executes a series of instructions.

13. The method of claim 12, wherein the series of instructions comprises an OS.

14. A method of controlling the power supply of an image forming apparatus comprising:
sensing an at least one cover unit as being opened;
cutting off a power supply to an at least one replaceable unit, comprising a customer replaceable unit monitoring unit (CRUM) to manage a state of the replaceable unit when the at least one cover unit is opened, and maintaining cut off to the at least one replaceable unit for a predetermined period of time that begins after closing the cover;
sensing the at least one cover unit as being closed; and
waiting for a predetermined period of time to elapse, and returning the power supply to the at least one replaceable unit,
wherein the CRUM comprises:
a memory unit to store an initialization program different from an operating system (OS) operated by the image forming apparatus unique information associated with the replaceable unit and status information on use of consumables used in the image forming apparatus; and
a central processing unit (CPU) which communicates with the memory unit, wherein the CPU is operable to perform initialization of the replaceable unit using the initialization program which operates separately from the OS operated by the image forming apparatus when the replaceable unit is detached from and attached to the image forming apparatus, to perform authentication and cryptographic data communication with a main body of the image forming apparatus.

15. The method of claim 14, wherein sensing the at least one cover unit is closed further comprises sensing that the at least one cover unit has been shock-absorbed by a shock-absorbing unit to lessen an impact.

16. The method of claim 14, wherein the operation of cutting off the power supply to the at least one replaceable unit includes cutting off the power supply to the CRUM prior to installing the CRUM in each of the at least one replaceable unit.

17. The method of claim 16, wherein the CPU executes a series of instructions.

18. The method of claim 17, wherein the series of instructions comprises an OS.

19. The method of claim 16, wherein a main board unit is connected to the CRUM in the at least one replaceable unit via a signal line and a power line.

20. The method of claim 19, wherein the main board unit cuts off the power supply via the power line.

* * * * *